(12) United States Patent
Breau et al.

(10) Patent No.: US 7,924,789 B1
(45) Date of Patent: Apr. 12, 2011

(54) FOREIGN AGENT ADDRESS ASSIGNMENT FOR MOBILE IP PATH OPTIMIZATION

(75) Inventors: Jeremy R. Breau, Kansas City, MO (US); Frederick C. Rogers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1037 days.

(21) Appl. No.: 11/697,139

(22) Filed: Apr. 5, 2007

(51) Int. Cl.
*H04W 4/00* (2009.01)

(52) U.S. Cl. ..... 370/331; 370/338; 370/349; 455/414.1; 455/450; 709/227; 709/245

(58) Field of Classification Search .................. 370/329, 370/328, 331, 338, 349; 455/433, 414.1, 455/450; 709/227, 245
See application file for complete search history.

(56) References Cited

U.S. PATENT DOCUMENTS

| | | | | |
|---|---|---|---|---|
| 6,928,282 B2 * | 8/2005 | Taniguchi | ..................... | 455/433 |
| 6,988,148 B1 * | 1/2006 | Sheth | ............................. | 709/245 |
| 7,366,147 B2 * | 4/2008 | O'Neill | .......................... | 370/338 |
| 7,460,547 B2 * | 12/2008 | Thubert et al. | ................. | 370/401 |
| 7,536,482 B1 * | 5/2009 | Lau | ................................. | 709/249 |
| 7,577,119 B2 | 8/2009 | Yokota et al. | | |
| 2002/0015396 A1 * | 2/2002 | Jung | ............................. | 370/338 |
| 2002/0155827 A1 * | 10/2002 | Agrawal et al. | ............... | 455/414 |
| 2003/0045287 A1 * | 3/2003 | Taniguchi | ..................... | 455/433 |
| 2004/0047322 A1 * | 3/2004 | O'Neill | .......................... | 370/338 |
| 2004/0066760 A1 * | 4/2004 | Thubert et al. | ................. | 370/329 |
| 2004/0136337 A1 * | 7/2004 | Warrier et al. | ................. | 370/328 |
| 2004/0141477 A1 * | 7/2004 | Xu et al. | ........................ | 370/328 |
| 2006/0062228 A1 * | 3/2006 | Ota et al. | ....................... | 370/401 |
| 2007/0086382 A1 * | 4/2007 | Narayanan et al. | ........... | 370/331 |

* cited by examiner

*Primary Examiner* — William Trost, IV
*Assistant Examiner* — Emmanuel Maglo

(57) ABSTRACT

A method, system, and computer-readable media are provided for creating an optimized communication path between mobile devices. The method includes receiving a request to transmit data to a destination mobile device, and identifying a destination IP address of a destination mobile device within the request. The method further includes determining if the destination IP address is located within a routing table, and bypassing a reverse tunneling procedure if the destination IP address is located within the routing table. Additionally, the method includes transmitting the data directly to destination foreign agent of the destination mobile device.

18 Claims, 5 Drawing Sheets

FOREIGN AGENT ADDRESS ASSIGNMENT FOR MOBILE IP PATH OPTIMIZATION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Mobile IP (MIP) is an Internet Engineering Task Force (IETF) standard communication protocol that is designed to allow mobile devices to maintain a permanent IP address (home address) associated with one network (home network) and stay connected when moving to a network with a different IP address. MIP supports mobility by transparently binding the home address of the mobile device with its care-of address. The care-of-address is usually the IP address of the foreign agent. This mobility binding is maintained by routers known as mobility agents. Mobility agents are of two types—home agents and foreign agents. The home agent, a designated router in the home network of the mobile device, maintains the mobility binding in a mobility binding table. The purpose of this table is to map a mobile device's home address with its care-of address and forward packets accordingly. The home agent stores information about mobile devices whose permanent address is in the home agent's network. Foreign agents are routers on the foreign network where the mobile device is currently visiting. The foreign agent maintains a visitor list which contains information about the mobile devices currently visiting that network. When a user leaves the home network and enters the domain of a foreign network, the foreign agent of the foreign network uses MIP to inform the home network of a care-of address to which all packets for the user's device should be sent.

When a device (mobile or non-mobile) wants to communicate with the mobile device, it sends an IP packet addressed to the permanent home IP address of the mobile device. These packets are intercepted by the home agent, which uses a table to determine if the mobile device is currently visiting another network. The home agent finds out the mobile device's care-of address and constructs a new IP header that contains the mobile device's care-of address as the destination IP address. The original IP packet is put into the payload of this IP packet, and the home agent then sends the packet to the foreign agent servicing the mobile device. This process of encapsulating one IP packet into the payload of another is known as IP-in-IP encapsulation or tunneling. The packets are decapsulated at the end of the tunnel by the foreign agent to remove the added IP header and delivered to the mobile device. When acting as sender, mobile device simply sends packets to the other communicating device through the foreign agent. To send the data packets to the other device, the foreign agent uses a reverse tunneling procedure by tunneling mobile device's packets to the mobile device's home agent, which in turn forwards them to the communicating device.

Reverse tunneling decreases the efficiency of a wireless service provider as the service provider has to spend additional time and resources executing additional steps of sending data packets to each mobile device's home agent each time data is to be transmitted from one mobile device to another. Consequently, there is a need for a system and method that will optimize the communication path between multiple mobile devices by bypassing the reverse tunneling of data packets to each mobile device's home agent.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system, method, and computer readable-media for, among other things, creating an optimized communication path between mobile devices.

In a first aspect, a set of computer-readable media provide a method that includes assigning pools of IP addresses to foreign agents, wherein one pool is assigned to one foreign agent and each foreign agent has a different pool. The method further includes receiving a registration request from a mobile device, and identifying a pool of addresses assigned to a foreign agent of the mobile device. Additionally, the method includes assigning an IP address from the identified pool of IP addresses to a mobile device.

In a second aspect, a system is provided that includes a mobile devices for sending data to another mobile device within a communication session; a home agent for assigning pools of IP addresses to one of each of a plurality of foreign agents, and assigning an IP address to the mobile device from a pool of IP addresses associated with an IP address of a foreign agent within a registration request; and a foreign agents for routing data directly to another foreign agent based on destination IP address of a destination mobile device.

In a third aspect, a set of computer-readable media provide another method that includes receiving a request to transmit data to a destination mobile device, and identifying a destination IP address of a destination mobile device within the request. The method further includes determining if the destination IP address is located within a routing table, and bypassing a reverse tunneling procedure if the destination IP address is located within the routing table. Additionally, the method includes transmitting the data directly to destination foreign agent of the destination mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
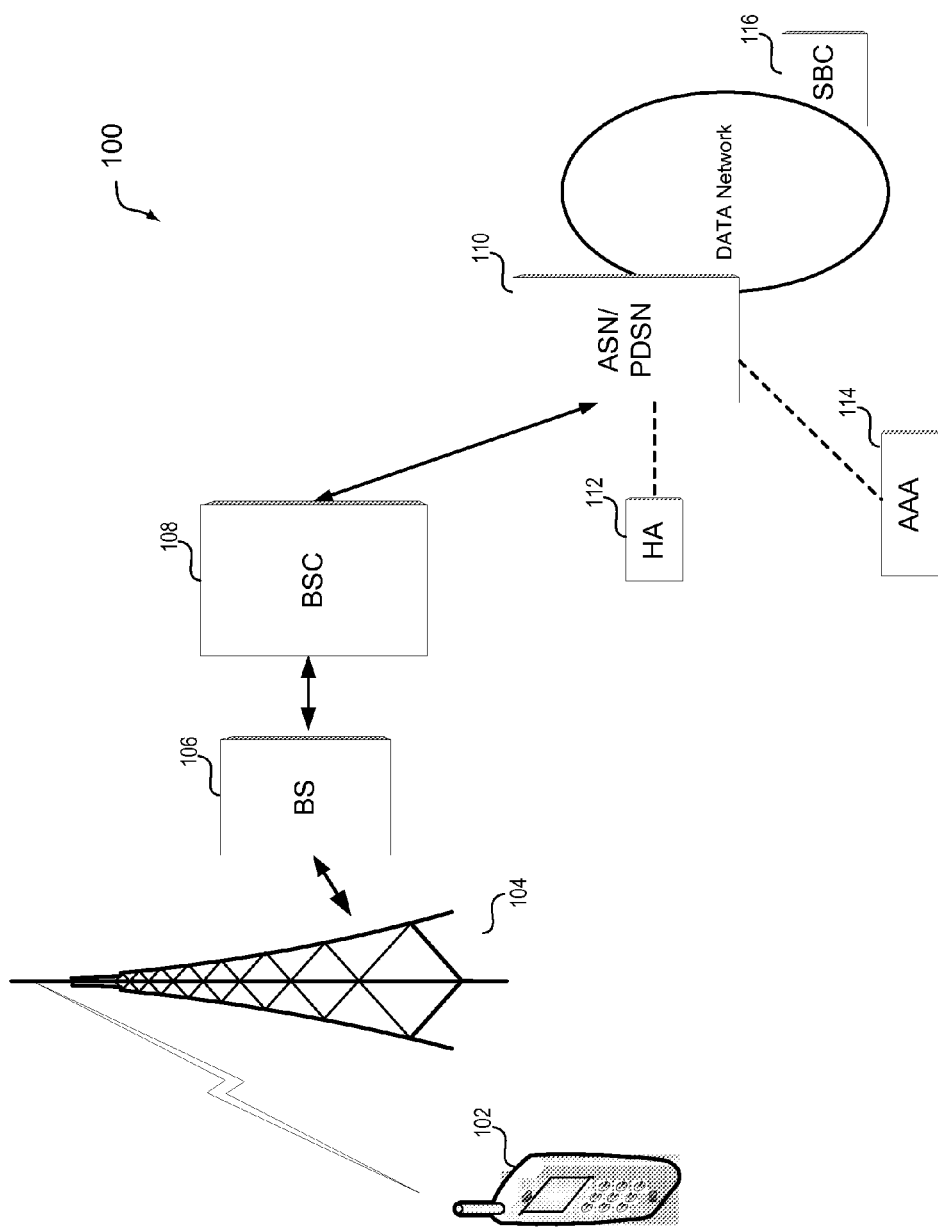
FIG. 1 is a block diagram of an embodiment of a communication network that can be employed by the invention.

FIG. 1 is a block diagram of an embodiment of a communication network 100 that can be employed by the invention. Mobile device 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Station (BS) 106 contains equipment for transmitting and receiving of radio signals from a communication tower 104. BS 106 also has other equipment for encrypting and decrypting communication with the Base Station Controller (BSC) 108. The BSC 108 may be configured to receive radio signals that are converted into Time Division Multiplexing (TDM) from a BS 106. In an embodiment, the BSC 108 can have a plurality of BSs under its control. The BSC 108 may handle the allocation of radio channels, may receive measurements from mobile devices, and can control handovers from one BS to another BS. Another function of the BSC 108 is to act as a concentrator of communication sessions where many different low capacity connections to the BSs (with relatively low utilization) become reduced to a smaller number of connections towards a Mobile Switching Center (MSC) (with a high level of utilization). The BSC may also be configured to send voice information from the TDM signal to the MSC and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party, and can place a second call to the called party. The effect of this behavior may be that the signaling traffic and media traffic (voice, video, etc.) crosses the SBC. This behavior may also be prevalent during conference communications.

Figure 2:
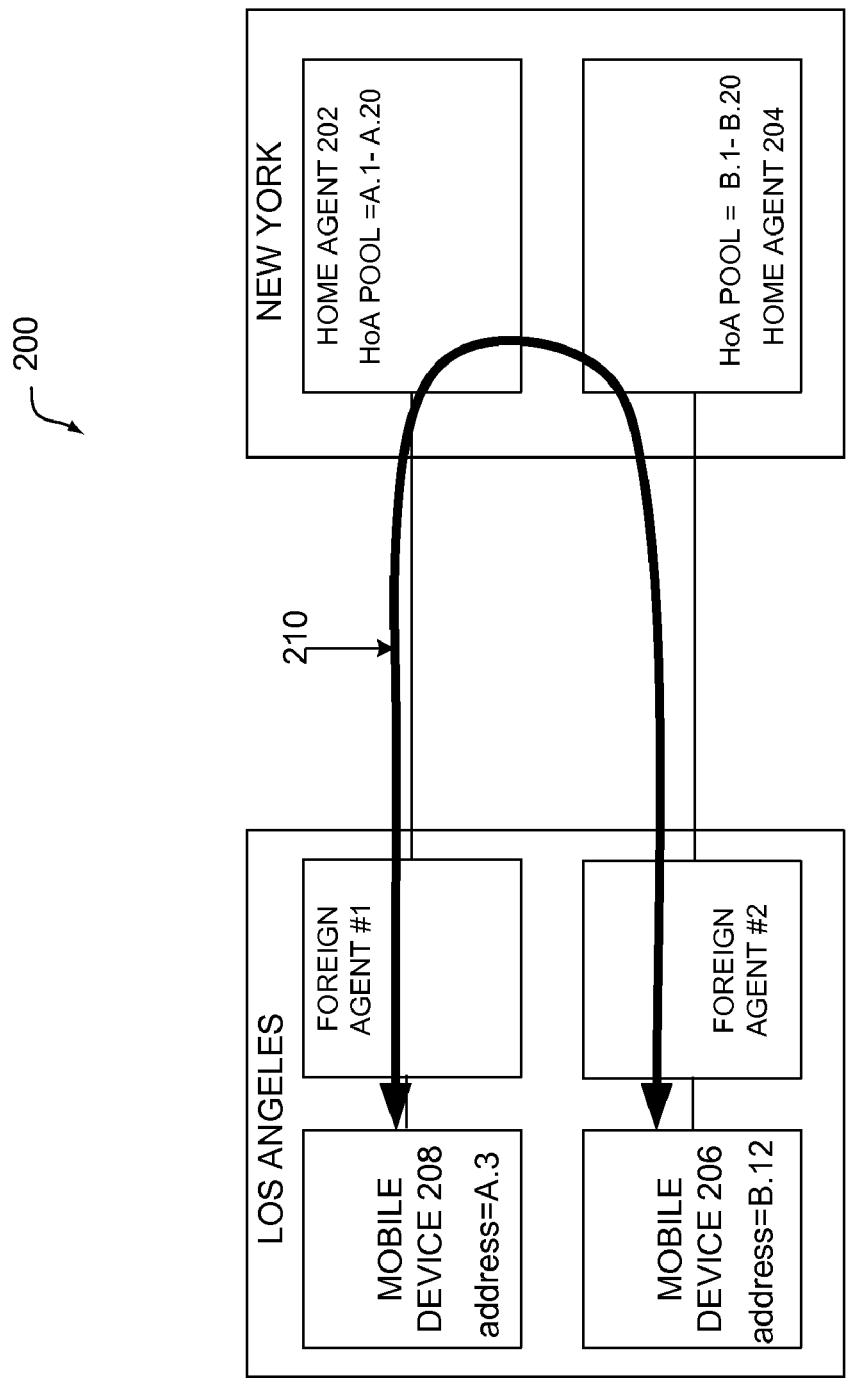
FIG. 2 is a block diagram of a prior art system and method for facilitating a communication session between two mobile devices that are away from their home networks.

FIG. 2 is a block diagram of a prior art system and method 200 for facilitating a communication session between two mobile devices that are away from their home networks. In FIG. 2, mobile devices 206 and 208, each located in foreign networks in Los Angeles, have home networks and respective home agents 202 and 204 located in New York. In this example, mobile device 202 may be a source mobile device that initiates a communication session with mobile device 206. Mobile device 208 first registers with its home agent 202 through foreign agent #1. The mobile device sends a registration request to foreign agent #1 that includes the IP address of its home agent. Foreign agent #1 in turn includes a care-of-address, the IP address of foreign agent #1, within the request and forwards the request to the home agent 202. The home agent 202 authenticates the requests and assigns an IP address to the mobile device 208 from its default Home Address (HoA) pool. The HoA pool includes IP addresses A.1-A.20. When assigning the HoA, the home agent 202 selects the next available IP address from the pool with zero intelligence. In this example, the home agent selects and assigns IP address A.3 to the mobile device 208, and sends the selected IP address to the mobile device 208 through foreign agent #1.

Once the mobile device 208 receives the assigned IP address (A.3), it can begin to send data packets to mobile device 206 through foreign agent #1. Foreign agent #1 will use a reverse tunneling procedure to establish a communication link with the home agent 202 in order to transfer the data packets to the mobile device 206. Within the data packets, the IP address of the mobile device's 206 home agent 204 will be identified. The data packets are then routed to the home agent 204, and the home agent 204 selects the next available IP address within its HoA pool. The home agent 204 assigns the selected IP address to the mobile device 206 and tunnels the selected IP address along with the data packets to foreign agent #2. Foreign agent #2 then sends the selected IP address and data packets to the mobile device 206.

Path 210 shows the route data packets travel when being sent from one mobile device to the other. As depicted, the data packets must travel across the United States from Los Angeles to New York and then back to Los Angeles in order to be received. Such a path is not the best route for the data packets to travel. A more optimal path would be to route the data packets within the same geographic location without having to waste additional time and resources sending the data packets to the home agents in New York. As shown, the foreign agents are in the same geographic location of Los Angeles. In other embodiments, two foreign agents may be considered to be in the same geographic location if they are in the same state or within a predetermined distance away from each other.

Figure 3:
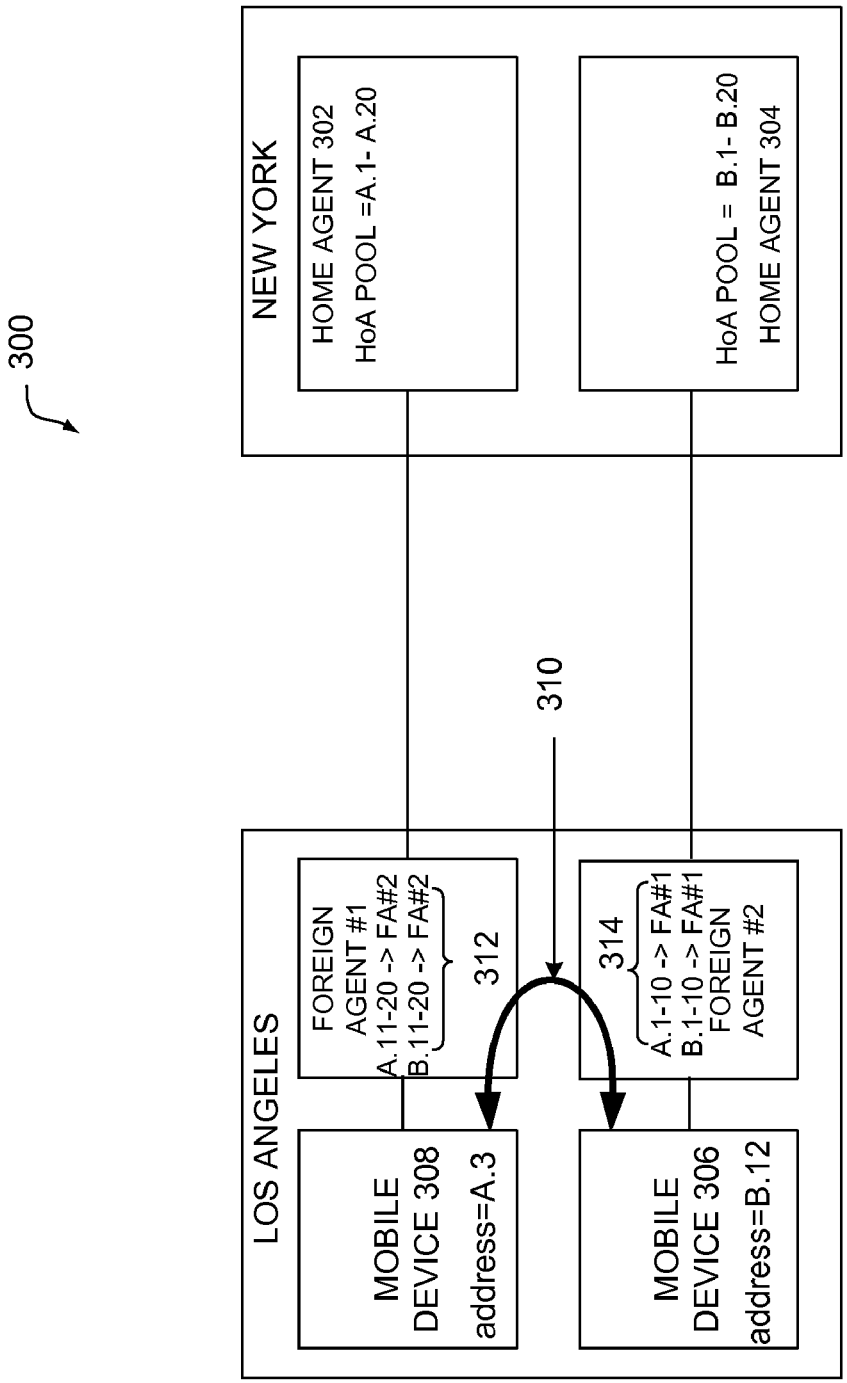
FIG. 3 is a block diagram of an embodiment of an optimized system and method for facilitating a communication session between two mobile devices that are away from their home networks.

FIG. 3 is a block diagram of an embodiment of an optimized system and method 300 for facilitating a communication session between two mobile devices that are away from their home networks. Path 310 is an optimized communication path showing a route data packets travel between two mobile devices being routed by two foreign agents without having to be transmitted or reversed tunneled to each mobile device's home agent. The optimized communication path 310 is obtained by including routing tables with routing logic that informs a foreign agent where to route a data packet based on a destination IP address of the data packet. The routing logic within each foreign agent's routing table may include information from one or more home agents that informs a foreign agent where to route data packets based on the IP address the home agent assigns to a mobile device.

Before a mobile device even registers with a home agent, the routing tables are provided to the foreign agents. The routing logic in the routing tables are based on home agents assigning a pool of IP addresses to one more foreign agents. For example, in FIG. 3, home agent 302 has divided its list of IP addresses (A.1-A.20) into two separate pools. A first pool of IP addresses, including IP addresses A.1-A.10, is created and assigned to foreign agent #1. The home agent 302 will associate foreign agent #1's IP address with the first pool of IP address and will store the association in its binding table. A second pool of IP addresses, including IP addresses A.11-A.20, is created and assigned to foreign agent #2. The home agent 302 will associate foreign agent #2's IP address with the second pool of IP address and will store the association in its binding table. Similarly, home agent 304 has divided its list of IP addresses (B.1-B.20) into two separate pools. A first pool of IP addresses, including IP addresses B.1-B.10, is created and assigned to foreign agent #1. The home agent 304 will associate foreign agent #1's IP address with the first pool of IP address and will store the association in its binding table. A second pool of IP addresses, including IP addresses B.11-B.20, is created and assigned foreign agent #2. The home agent 304 will associate foreign agent #2's IP address with the second pool of IP address and will store the association in its binding table.

Each home agent then informs each foreign agent of their respective assignment of IP addresses, and also provides routing logic to be included in a routing table that informs the foreign agents where to route data packets based on the pool of addresses the home agents have assigned to each foreign agent. For example, foreign agent #1 includes routing logic 312 that informs the foreign agent that a data packet with a destination IP address between A.1-A.10 or B.1-B.10 should be routed to foreign agent #2. Similarly, foreign agent #2 includes routing logic 314 that informs the foreign agent that a data packet with a destination IP address between A.1-A.10 or B.1-B.10 should be routed to foreign agent #1.

Thereafter, mobile device 308 registers itself with home agent 302 through foreign agent #1 and is assigned IP address A.3, and mobile device 306 registers itself with home agent 304 through foreign agent #2 and is assigned IP address B.12. Accordingly, when mobile device 308 wants to send a data packet to mobile device 306, the mobile device 308 will first send the data packet to foreign agent #1. Foreign agent #1 will identify the destination IP address of the packet as being B.12 and will scan its routing table to see if the B.12 IP address is associated with a foreign agent. When foreign #1 scans its routing table, the routing logic will instruct foreign agent #1 to route the data packet to foreign agent #2 since the IP address B.12 is associated with foreign agent #2. Once the data packet is sent to foreign agent #2, foreign agent #2 can then transmit the data packet to mobile device 306. When mobile device 306 wants to send a data packet to mobile device 308, the mobile device 306 will first send the data packet to foreign agent #2. Foreign agent #2 will identify the destination IP address of the data packet as being A.3 and will scan its routing table to see if the A.3 IP address is associated with a foreign agent. When foreign #2 scans its routing table, the routing logic will instruct foreign agent #2 to route the data packet to foreign agent #1 since the IP address A.3 is associated with foreign agent #1. Once the data packet is sent to foreign agent #1, foreign agent #1 can then transmit the data packet to mobile device 308.

In an embodiment, if a mobile device moves away from the coverage area of a first foreign agent after an optimized path, such as path 310, has been established, the first foreign agent can send an Internet Control Messaging Protocol (ICMP) message to the other foreign agent. The ICMP message informs the other foreign agent that the first foreign agent is no longer providing service to the mobile device. For example, if during a communication session mobile device 306 moves away from the service are of foreign #2 after the optimal path 310 has been created, foreign agent #2 can send an ICMP message to foreign agent #1 to inform foreign agent #1 that foreign agent #2 is no longer communicating with mobile device 306. Foreign agent #1 can then proceed to reverse tunnel data packets from mobile device 308 to home agent 302 and subsequently to mobile device 306 using a path 210 as described in FIG. 2 that would include the mobile device's 306 new foreign agent. In an embodiment, if the mobile device happens to move to the service area of foreign agent #1, foreign agent #1 can be configured to route data packets to directly to and from mobile device 306 in its communication session with mobile device 308.

Figure 4:
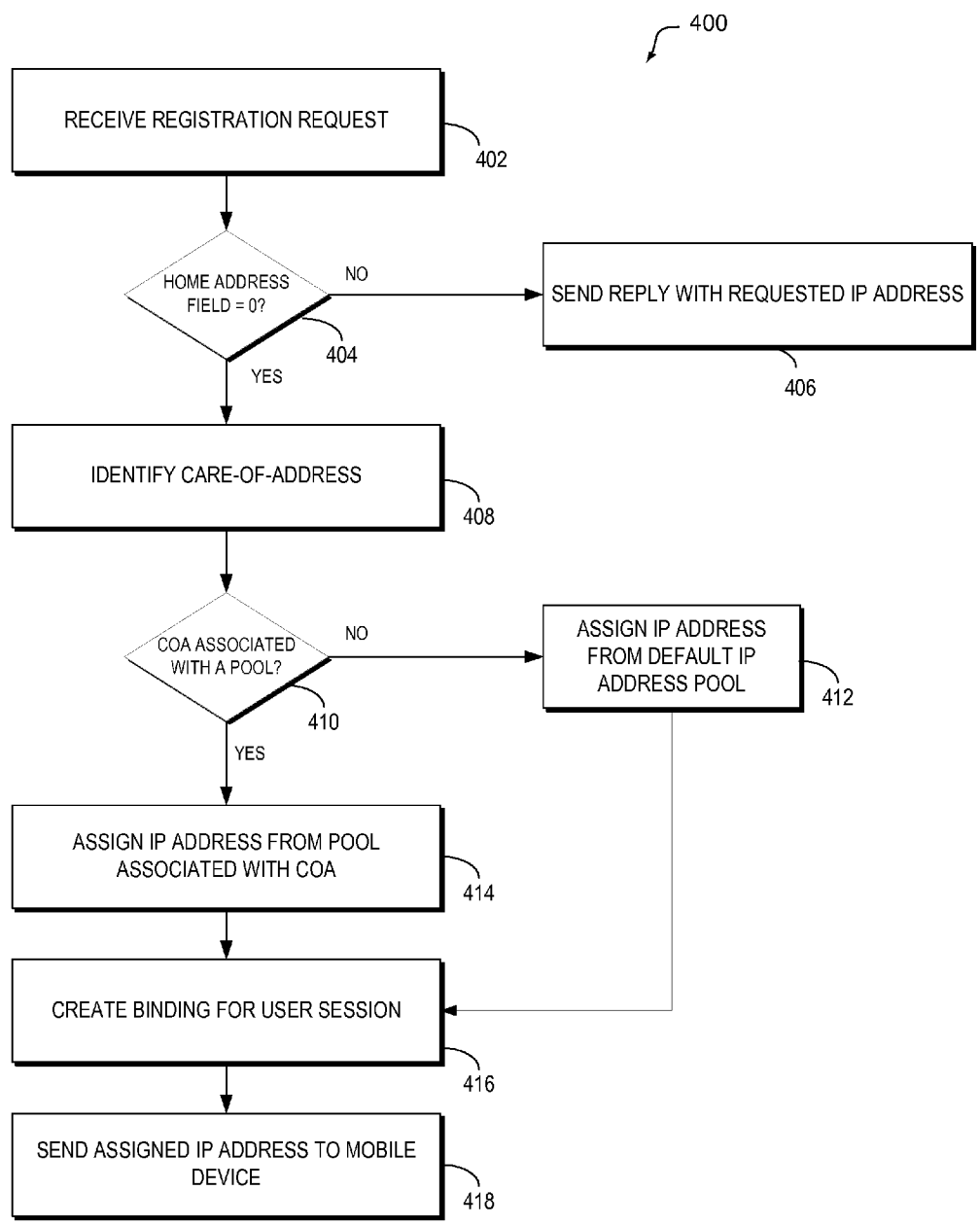
FIG. 4 is flow diagram of an embodiment of a method for registering a mobile device with its home agent when creating an optimized communication path.

FIG. 4 is flow diagram of an embodiment of a method 400 for registering a mobile device with its home agent when creating an optimized communication path. At operation 402, a MIP registration request is received by a home agent. At operation 404, a determination is made as to whether the home address field of the registration request equals zero. A home address field that does not equal zero indicates that the mobile device already knows which IP address it would like to receive from the home agent. The field will actually include the requested IP address. At operation 406, the request IP address in the home address field is sent to the mobile device in a reply. However, if the home address field equals zero, the home agent will know that it has to assign an IP address to the mobile device.

At operation 408, a care-of-address related to the mobile device is identified within the request. In an embodiment, the care-of-address is the IP address of the foreign agent that is supporting the mobile device. At operation 410, a determination is made as to whether the care-of-address is associated with a pool of IP addresses. If the care-of-address is not associated with a pool of IP addresses, the home agent assigns an IP address to the mobile device from a default pool of IP address that is not associated with a foreign agent at operation 412. At operation 416, a binding is created for the user session, and the assigned IP address is sent to the mobile device at operation 418. However, if the care-of-address is associated with a pool of addresses, an IP addresses is assigned to the mobile device from the associated pool. At operation 416, a binding is created for the user session, and the assigned IP address is sent to the mobile device at operation 418.

Figure 5:
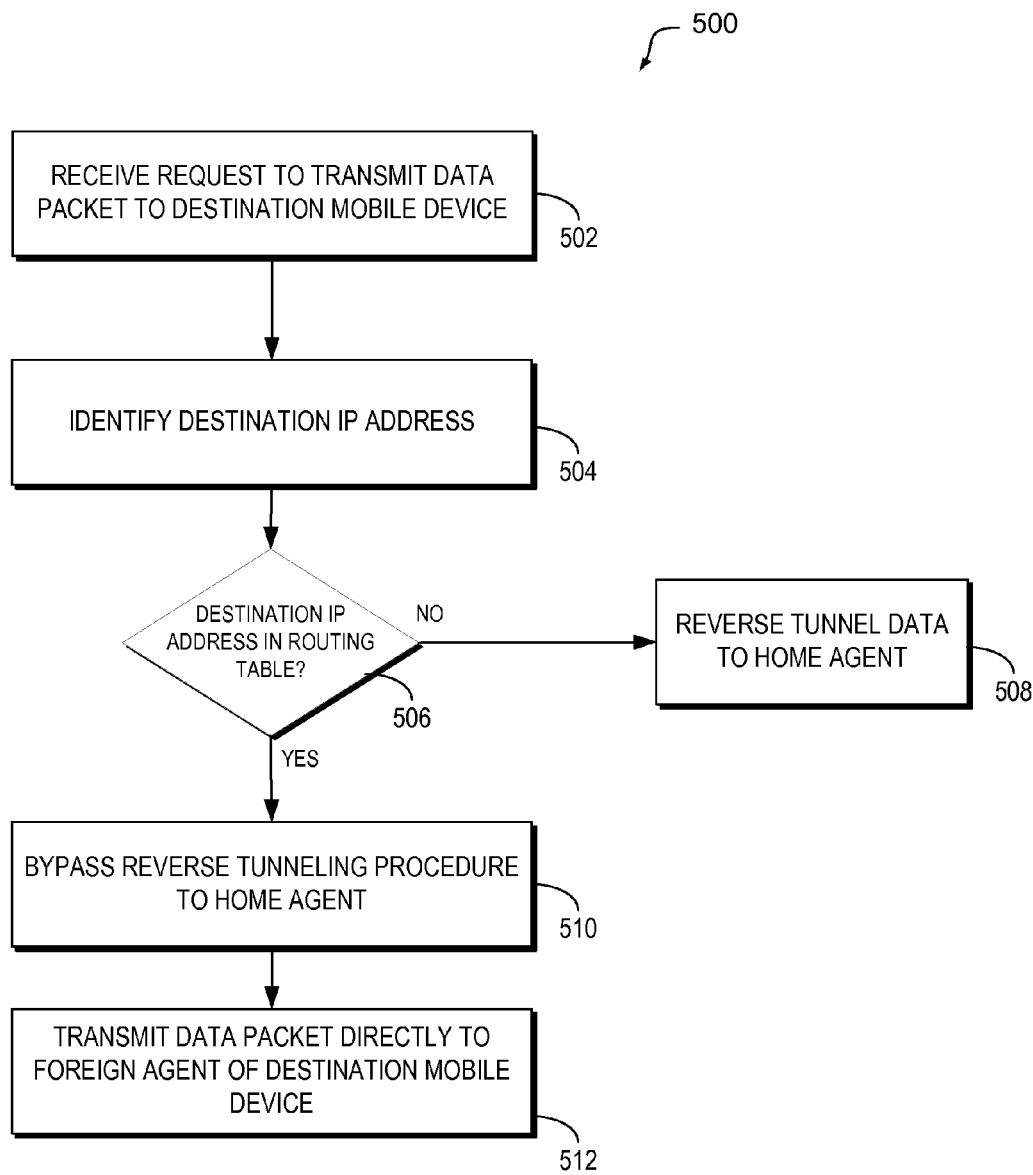
FIG. 5 is a flow diagram of an embodiment of a method for routing data packets to a foreign agent within an optimized communication path.

FIG. 5 is a flow diagram of an embodiment of a method 500 for routing data packets to a foreign agent within an optimized communication path. At operation 502, a request is received to transmit a data packet to destination mobile device. In an embodiment, the request is received by a source foreign agent of source mobile device. At operation 504, the destination IP address of the destination mobile device is identified within the request. At operation 506, a determination is made as to whether the destination IP address is associated with a foreign agent within a routing table of the source foreign agent. If it is determined that the destination IP address is not associated with a foreign agent, the data packet is reversed tunneled to the home agent of the source mobile device, and the data packet travels the same path to the destination mobile device as path 210 as described in FIG. 2. However, if it is determined that the destination IP address is associated with a foreign agent within the routing table, the reverse tunneling procedure is bypassed at operation 510. At operation 512, the data packet is routed to the foreign agent associated with the destination IP address as stated in the routing table.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon for performing a method of providing an optimized communication path between mobile devices, the method comprising:
dividing a pool of home IP addresses into separate IP address pools;
assigning the IP address pools to foreign agents, wherein one IP address pool is assigned to one foreign agent and each foreign agent has a different IP address pool;
receiving a registration request from a mobile device, wherein the registration request is received via a foreign agent of the mobile device;
identifying one of the IP address pools that is assigned to the foreign agent of the mobile device;
assigning an IP address from the identified IP address pool to the mobile device; and
providing a routing logic to each of the foreign agents, wherein the routing logic indicates where to route data based on the IP address assigned to the mobile device, wherein the routing logic enables a foreign agent to transmit data from another mobile device directly to the foreign agent of the mobile device.

2. The media according to claim 1, wherein the identified IP address pool is based on an IP address of the foreign agent that is included within the registration request.

3. The media according to claim 1, wherein the IP address pools are assigned to foreign agents located in the same geographic location.

4. The media according to claim 1, wherein a home agent of the mobile device executes the method of claim 1.

5. The media according to claim 3, wherein the foreign agents are in the same geographic location if they are within a predetermined distance from each other.

6. One or more non-transitory computer-readable media having computer-useable instructions embodied thereon for performing a method of providing an optimized communication path between mobile devices, the method comprising:
storing a routing table, wherein the routing table includes,
(1) destination IP addresses that are received at a foreign agent from a home agent,
(2) routing logic that associates the destination IP addresses with foreign agents that also receive destination IP addresses from the home agent, wherein an association between a particular destination IP address and a particular foreign agent indicates that a particular data packet addressed to the particular destination IP address is to be routed to the particular foreign agent;
receiving, at the foreign agent, a data packet from a source mobile device, wherein the data packet is addressed to a destination IP address;
determining whether the destination IP address is in the routing table; and
when the destination IP address is in the routing table, using the routing logic to route the data packet directly to a destination foreign agent, wherein the destination foreign agent is associated with the destination IP address.

7. The media according to claim 6, wherein the routing logic is received from a home agent.

8. The media according to claim 6, further comprising when the destination IP address is not in the routing table, routing the data packet to a home agent of the source mobile device.

9. The media according to claim 6, wherein the destination IP address is the address of a destination mobile device.

10. The media according to claim 9, further comprising receiving an Internet Control Messaging Protocol message from the destination foreign agent when the destination mobile device moves out of a service area of the destination foreign agent.

11. The media according to claim 10, wherein a reverse tunneling procedure is initiated when the Internet Control Messaging Protocol message is received in order to continue a communication session with the destination mobile device.

12. One or more non-transitory computer-readable media having computer-useable instructions embodied thereon for performing a method of providing an optimized communication path between mobile devices, the method comprising:
receiving, at a foreign agent, a request from a source mobile device to transmit a data packet to a destination mobile device;

identifying a destination IP address of the destination mobile device within the request;

determining if the destination IP address is located within a routing table, wherein the routing table includes IP addresses that are provided to the foreign agent by a home agent of the destination mobile device;

when the destination IP address is located within the routing table, identifying, at the foreign agent, a destination foreign agent that is associated with the destination IP address, wherein the destination foreign agent is the destination foreign agent of the destination mobile device;

transmitting the data packet directly from the foreign agent to the destination foreign agent of the destination mobile device.

13. The media according to claim 12, wherein the data packet is transmitted directly from the foreign agent to the destination foreign agent without transmitting the data packet to a home agent.

14. The media according to claim 12, wherein the foreign agent and the destination foreign agent are located in the same geographic location.

15. The media according to claim 12, wherein the routing table includes routing logic based on pools of IP addresses assigned by a home agent of the source mobile device and the home agent of the destination mobile device.

16. The media according to claim 12, further comprising receiving an Internet Control Messaging Protocol message from the destination foreign agent when the destination mobile device moves out of a service area of the destination foreign agent.

17. The media according to claim 16, further comprising initiating a reverse tunneling procedure when the Internet Control Messaging Protocol message is received in order to continue a communication session with the destination mobile device.

18. The media according to claim 16, further comprising transmitting the data directly to the destination mobile device when the Internet Control Messaging Protocol message is received and the mobile device moves to the service area of the source foreign agent.

\* \* \* \* \*